No. 768,114. PATENTED AUG. 23, 1904.
G. R. DEAN.
POWER TRANSMITTING DEVICE.
APPLICATION FILED AUG. 5, 1903.
NO MODEL. 2 SHEETS—SHEET 1.
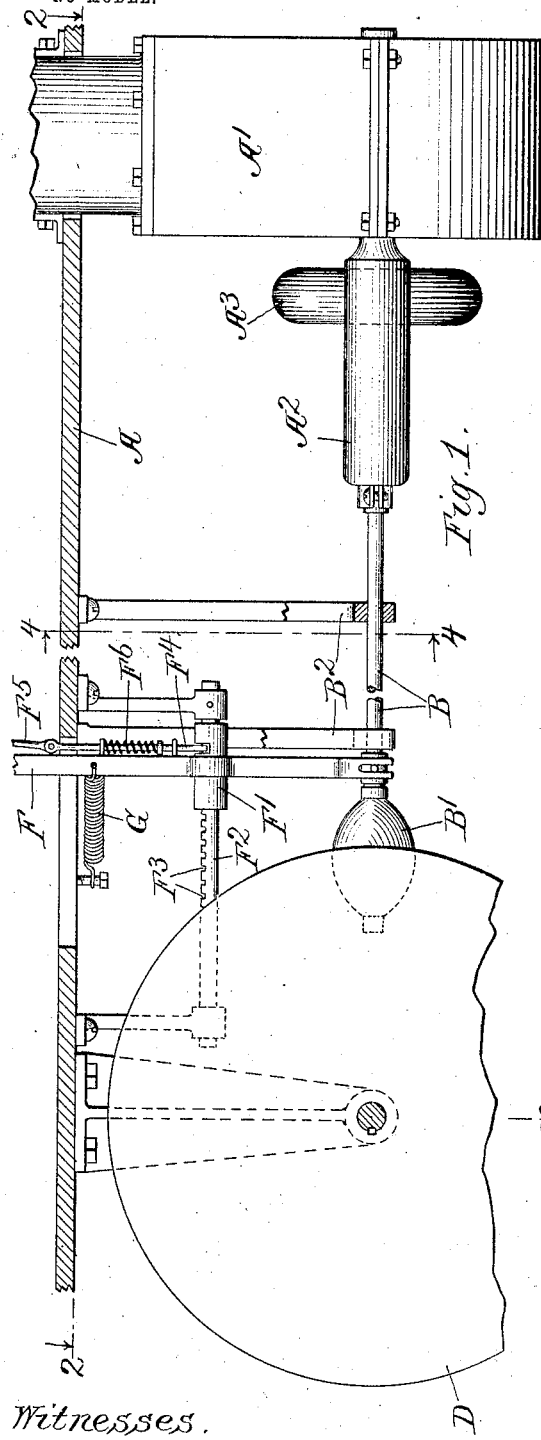
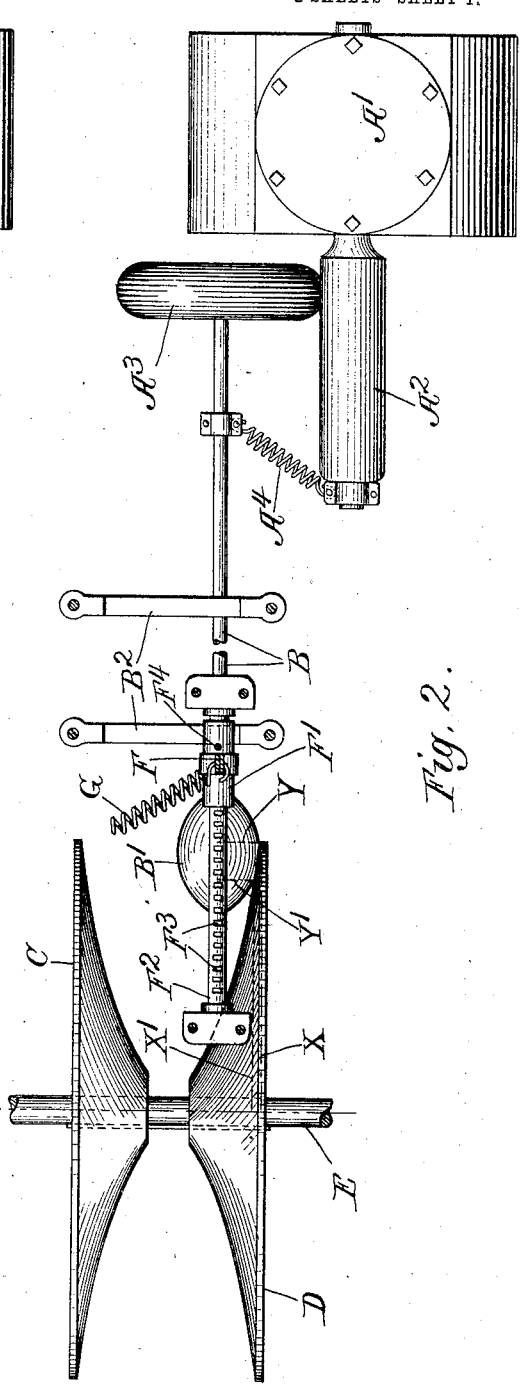
Witnesses.
Edward T. Wray
Howard L. Kraft
Inventor.
George R. Dean.
by Parker Carter
Attorneys.

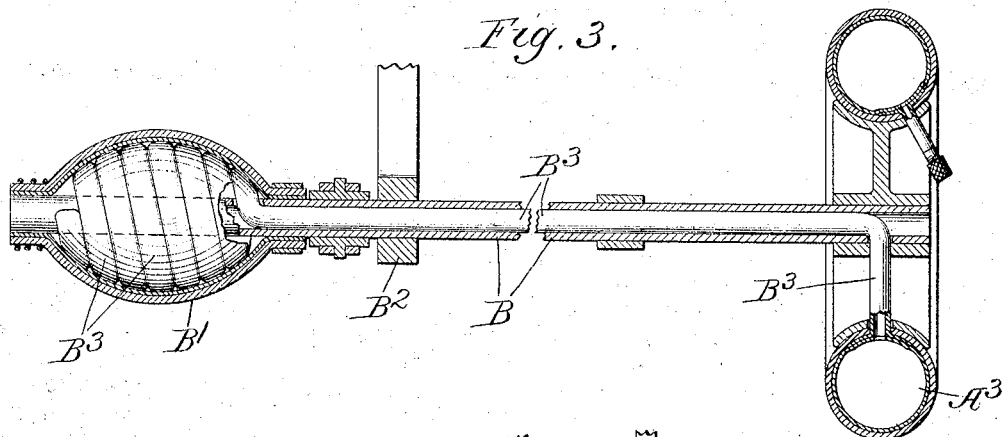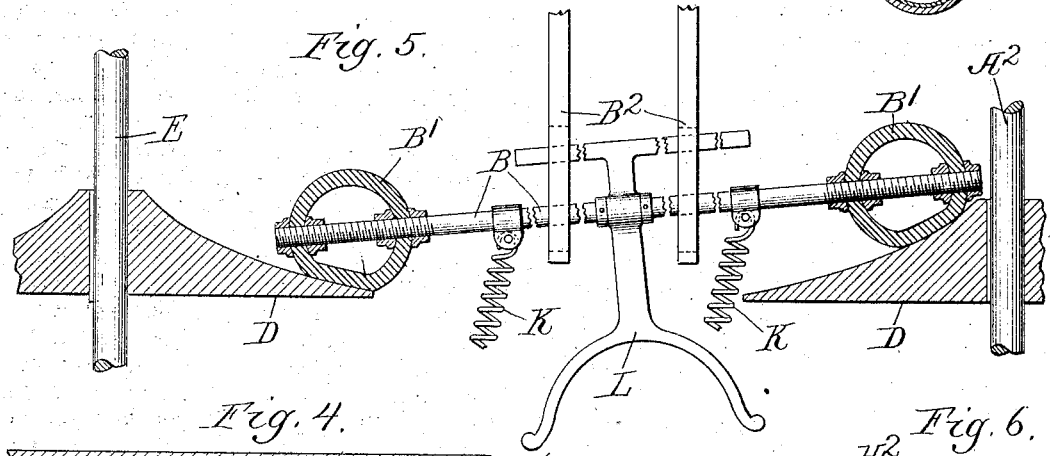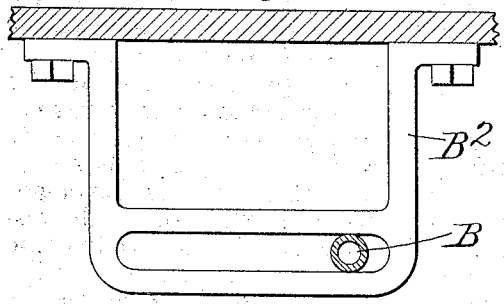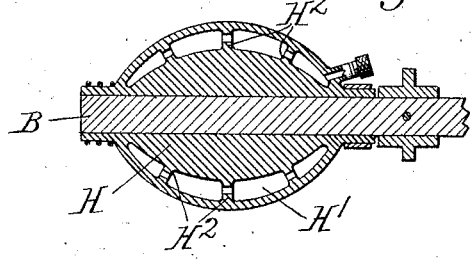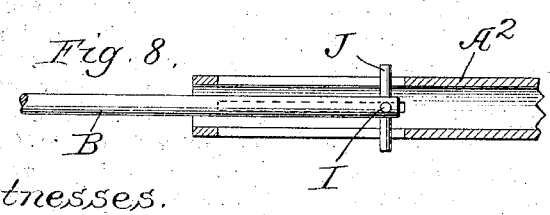

No. 768,114. Patented August 23, 1904.

UNITED STATES PATENT OFFICE.

GEORGE R. DEAN, OF CHICAGO, ILLINOIS.

POWER-TRANSMITTING DEVICE.

SPECIFICATION forming part of Letters Patent No. 768,114, dated August 23, 1904.

Application filed August 5, 1903. Serial No. 168,252. (No model.)

*To all whom it may concern:*

Be it known that I, GEORGE R. DEAN, a citizen of the United States, residing at Chicago, in the county of Cook and State of Illinois, have invented a certain new and useful Improvement in Power-Transmitting Devices, of which the following is a specification.

My invention relates to power-transmitting devices properly adapted to vary and control the speed of the driven device.

My invention is illustrated in the accompanying drawings, wherein—

Figure 1 is a diagrammatic view showing one form of my device as applied to an automobile. Fig. 2 is a section on line 2 2, Fig. 1. Fig. 3 is a section through the movable shaft of the device. Fig. 4 is a section on line 4 4, Fig. 1. Fig. 5 is a view showing a modified construction. Fig. 6 is a sectional view showing a modified construction of one of the engaging parts. Fig. 7 is a sectional view showing another modification of one of the engaging parts. Fig. 8 is a view showing a modified construction of the movable shaft.

Like letters refer to like parts throughout the several figures.

My present invention is particularly adapted for use in connection with devices where it is desired to transmit power from one device to another and to vary the speed of the driven device.

For purposes of illustration I have shown my construction diagrammatically, as it were, in order that it may be readily understood.

Referring now to Figs. 1 and 2, I have illustrated one form of my device adapted to be used in connection with automobiles. In Fig. 1 I have shown a portion A of the frame of the automobile and beneath which the mechanism is mounted. In this construction a motor A' of any desired kind is provided with a rotating shaft A². Associated with the shaft A² is a frictional engaging device A³, connected with a shaft B and normally forced against the shaft A² by some suitable device, such as the spring A⁴. The engaging device A³ may be of any suitable construction, and I have here illustrated it as consisting of a wheel provided with a flexible or pneumatic tire. The shaft B is provided at its other end with an engaging device B', of any suitable construction, but preferably more or less elastic or flexible. This engaging device is located between the frictional disks C and D, which are mounted upon the shaft E, which may be the axle of the automobile or any other driven shaft. The engaging part B' is moved back and forth across the face of one or the other of these disks, so as to vary the speed of the driven shaft. In view of the fact that the outer part of the disk travels at a higher rate of speed than the inner part some arrangement should be made to compensate for this condition, so as to prevent sliding and other undesirable results. This is accomplished in the present device by forming the engaging faces of the disks on a graduated curve, as shown, this curve being properly worked out to secure the desired result. For example, the engaging device B' engages the face of the disk for a considerable area, and this engaging face when the disk has the proper graduated curve is inclined to the axis of the engaging device. If, for example, we take any given point of contact between the engaging device B' and the disk D, the graduated curve should be so arranged that the ratio of the perpendicular distances between this point and the axis of the disk and the engaging device is equal to the ratio of similar distances from any other engaging point. In other words, referring to Fig. 2, the graduated curve of the disk D should be so arranged and proportioned that the ratio of the distance X to the distance Y is equal to the ratio of the distance X' to the distance Y'. The engaging device B', as before stated, may be of any desired construction, and I have shown it in these figures as an oval-shaped flexible or elastic device which readily conforms to the shape of the graduated curved face of the disks. It will be seen from this figure that with such a device the radius Y' will be shorter than the radius Y, and thus the proper contact area will be produced, and this contact area will automatically adjust itself, so that there will be no sliding during rotation, whatever may be the position of the disk and the engaging device. In other words, this is an automatic adjusting frictional speed-varying device.

The speed is varied by moving the shaft B longitudinally, so as to move the engaging device B' back and forth across the face of the disk D. Any suitable arrangement for this purpose may be utilized. As herein shown, I have provided an ordinary lever F, which projects through the part A and in proximity to the operator. This lever is provided with an enlarged hub F' and is mounted upon a stationary support F², said support being provided with a series of notches F³. The lever is preferably provided with the ordinary holding device F⁴, which engages said notches and which is lifted by means of the rod F⁵, associated with the lever F and provided with a handle, as is usual in such cases, the holding device being normally pressed into the notches when released by the spring F⁶. It will thus be seen that by moving this lever the shaft B and the engaging device B' may be moved back and forth.

In order to reverse the driven device, I provide the additional disk C. In this event if the engaging device B' is brought into contact with the disk C it will be seen that the motion of the shaft E is reversed. This may be done by moving the lever F to one side of the support F². A spring G, located above the support F², normally tends to twist the lever F, so as to force the engaging device B' into contact with the disk D. The shaft B works in suitable supporting-guides B², which are slotted, as shown in Fig. 4, so as to permit the side movement when it is desired to reverse the driven device. In Fig. 3 I have shown one form of this movable shaft with its engaging devices. In this form the shaft is hollow, and there is a tube B³ extending from the pneumatic tire of the engaging device A³ through the shaft and into the engaging device B', said tube being coiled thereon, as illustrated. By this arrangement when the pneumatic tire is blown up the air passes through the tube B³ and inflates it, thus inflating the engaging device B', which in this instance is made of flexible or elastic material. This engaging device B', as before stated, may be of any other desired form. It may, for example, be a metal disk or wheel or any other suitable device.

In Fig. 6 I have shown the engaging device B' as made of elastic material—such, for example, as rubber or the like—provided with a solid central part H and an outer engaging part, the two parts separated by the space H', which may be filled with air, said two parts being preferably connected by the webs H².

In Fig. 7 I have shown an engaging device B' consisting of a flexible metal disk.

Instead of using the engaging device A³, I may connect the movable shaft B directly to the driving-shaft A², as shown in Fig. 8. In this construction the driving-shaft A² is made hollow and is provided with four slots, through which pass the pins I and J. This permits the shaft B to slide back and forth and also permits it to be moved laterally.

In Fig. 5 I have shown a construction adapted to be used in connection with small machinery—such, for example, as sewing-machines. In this construction I provide the shaft B with two engaging devices B', and both the driven shaft E and the driving-shaft A² are provided with disks D, having the proper graduated curved engaged faces. The engaging device B' is held against the disks by the springs K. The shaft is provided with a controlling-piece L, which may be engaged by the knee of the operator, so as to be moved back and forth to vary the speed. In such devices, for example, as sewing-machines, it is found that in many garments it is necessary to run the machine at a slow speed for a little while and then at a high speed for straight sewing, and if this can be done a great saving can be obtained, and one working can do much more work with a single machine. By means of this arrangement the speed can be varied at will by the operator without stopping the machine and without any effort whatever, and it will therefore be seen that the greatest efficiency can be obtained. In this figure I have shown the engaging devices as flexible balls.

I have described in detail the various constructions embodying my invention; but it is of course evident that these constructions may be varied in many particulars and that parts may be omitted and others used with parts not herein shown, and I therefore do not limit myself to the devices illustrated.

I claim—

1. A speed-varying device comprising a frictional disk having a curved engaging face and an engaging part therefor adapted to be moved back and forth across the curved engaging face, such disk and engaging part so constructed and arranged that at various positions of contact the ratio between two lines drawn from the inner periphery of their zone of contact to their axes would be approximately equal to the ratio between two other such lines drawn from the outer periphery of their zone of contact to their axes.

2. A speed-varying device comprising a driven part, a disk connected with the driven part and having a curved engaging face, a movable engaging device adapted to engage said curved face, a support for said engaging device and means for moving said support back and forth, such disk and engaging part so constructed and arranged that at various positions of contact the ratio between two lines drawn from the inner periphery of their zone of contact to their axes would be approximately equal to the ratio between two other such lines drawn from the outer periphery of their zone of contact to their axes.

3. A speed-varying device comprising a disk having a curved engaging face, an engaging device adapted to engage said curved face, said engaging device being flexible so as to conform to the engaging face of the disk, such disk and engaging part arranged so that at various positions of contact the ratio between two lines drawn from the inner periphery of their zone of contact to their axes would be approximately equal to the ratio between two other such lines drawn from the outer periphery of their zone of contact to their axes.

4. A speed-varying device comprising a driven part, a disk associated with the driven part and provided with a curved engaging face, a movable engaging part adapted to engage said curved face, the said engaging part having a curved exterior to correspond to the curved engaging face of the disk, such disk and engaging part so constructed and arranged that at various positions of contact the ratio between two lines drawn from the inner periphery of their zone of contact to their axes would be approximately equal to the ratio between two other such lines drawn from the outer periphery of their zone of contact to their axes.

5. A speed-varying device comprising a disk having a curved engaging face, an engaging device therefor adapted to be moved back and forth across said curved face, said engaging device being hollow and formed of flexible material so as to adjust itself to the engaging face, such disk and engaging part arranged so that at various positions of contact the ratio between two lines drawn from the inner periphery of their zone of contact to their axes would be approximately equal to the ratio between two other such lines drawn from the outer periphery of their zone of contact to their axes.

6. A speed-varying device comprising a driving-shaft and a longitudinally-movable shaft, an inflatable engaging device at one end thereof adapted to engage the driving-shaft, a flexible hollow engaging device at the other end of said shaft, a flexible tube extending from the inflatable device through the shaft into the engaging device and coiled therein so that when the inflatable device is inflated the engaging device will also be inflated and a curved frictional disk connected with the driven part and adapted to be engaged by said engaging device.

7. A speed-varying device comprising two disks provided with opposed curved engaging faces, an elastic engaging device between them adapted to engage either of said curved faces and means for moving said engaging device from one disk to the other.

8. A speed-varying device comprising a frictional disk provided with a curved engaging face, an elastic engaging device adapted to engage said face and means for moving said engaging device back and forth thereacross, such disk and engaging part arranged so that at various positions of contact the ratio between two lines drawn from the inner periphery of their zone of contact to their axes would be approximately equal to the ratio between two other such lines drawn from the outer periphery of their zone of contact to their axes.

9. A speed-varying device comprising two disks provided with curved engaging faces, one associated with the driven and the other with the driving shaft, an engaging device associated with each of said disks, a connecting-piece connecting said engaging devices and a controlling device associated with said connecting-piece so that it may be moved back and forth to vary the speed of the driven device, such disk and engaging part so constructed and arranged that at various positions of contact the ratio between two lines drawn from the inner periphery of their zone of contact to their axes would be approximately equal to the ratio between two other such lines drawn from the outer periphery of their zone of contact to their axes.

10. A speed-varying device comprising two disks provided with curved engaging faces, one associated with the driven and the other with the driving shaft, a flexible engaging device associated with each disk and adapted to conform to the curved faces thereof, a connecting-piece connecting said engaging devices and a controlling device associated with said connecting-piece so that it may be moved back and forth to vary the speed of the driven device, such disk and engaging part arranged so that at various positions of contact the ratio between two lines drawn from the inner periphery of their zone of contact to their axes would be approximately equal to the ratio between two other such lines drawn from the outer periphery of their zone of contact to their axes.

11. A speed-varying device comprising a disk having a graduated curved engaging face, an engaging device therefor provided with a flexible engaging face adapted to conform to the curved face of the disk and means for varying their relative positions, such disk and engaging part arranged so that at various positions of contact the ratio between two lines drawn from the inner periphery of their zone of contact to their axes would be approximately equal to the ratio between two other such lines drawn from the outer periphery of their zone of contact to their axes.

12. A speed-varying device comprising a frictional disk having a concave engaging face, an engaging part therefor, means for varying their relative positions of engagement and for imparting motion to one of them, such disk and engaging part so constructed and arranged that at various positions of contact the ratio between two lines drawn from the inner periphery of their zone of contact to their axes would be approximately equal to the ratio between two other such lines drawn from the outer periphery of their zone of contact to their axes.

13. A speed-varying device comprising a frictional disk having a curved engaging face, an engaging part therefor, means for varying their relative positions of engagement and for imparting motion to one of them, such disk and engaging part so constructed and arranged that at various positions of contact the ratio between two lines drawn from the inner periphery of their zone of contact to their axes would be approximately equal to the ratio between two other such lines drawn from the outer periphery of their zone of contact to their axes.

14. A speed-varying device comprising a frictional disk having an engaging face, an engaging part therefor having a yielding face, means for varying their relative positions of engagement and for imparting motion to one of them, such disk and engaging part arranged so that at various positions of contact the ratio between two lines drawn from the inner periphery of their zone of contact to their axes would be approximately equal to the ratio between two other such lines drawn from the outer periphery of their zone of contact to their axes.

15. A speed-varying device comprising a frictional disk having an engaging face, an engaging part therefor, means for varying their relative positions of engagement and for imparting motion to one of them, the two having an extended line of engagement, such disk and engaging part so constructed and arranged that at various positions of contact the ratio between two lines drawn from the inner periphery of their zone of contact to their axes would be approximately equal to the ratio between two other such lines drawn from the outer periphery of their zone of contact to their axes.

16. A speed-varying device comprising a frictional disk having a concaved engaging face, and an engaging part therefor adapted to be moved back and forth across said concaved engaging face, said engaging part having a yielding surface so as to get considerable area of contact with the concaved engaging face.

17. A speed-varying device comprising a frictional disk, having a concaved engaging face, and an engaging part therefor, adapted to be moved back and forth across said concaved engaging face, said engaging part having a yielding surface so as to get considerable area of contact with the concaved engaging face, the axes of the disk and engaging part being approximately at right angles to each other.

18. A speed-varying device comprising two parts, one a driving and the other a driven part, one a frictional disk having a concaved engaging face, and the other an engaging part therefor, adapted to be moved back and forth across said concaved engaging face, said engaging part having a yielding surface so as to have considerable area of contact with the concaved engaging face.

GEORGE R. DEAN.

Witnesses:
EDWARD T. WRAY,
FANNY B. FAY.